United States Patent [19]

Lowrance et al.

[11] 3,872,224
[45] Mar. 18, 1975

[54] PROCESS FOR THE PRODUCTION OF BERYLLIUM HYDRIDE

[75] Inventors: Byron R. Lowrance, Birmingham, Mich.; Jesse Roger Mangham, Baton Rouge, La.

[73] Assignee: Ethyl Corporation, New York, N.Y.

[22] Filed: Aug. 24, 1964

[21] Appl. No.: 392,371

[52] U.S. Cl. ............................................... 423/645
[51] Int. Cl.............................................. C01b 6/00
[58] Field of Search ............ 23/204, 360, 361, 362, 23/363

Primary Examiner—Leland A. Sebastian
Assistant Examiner—R. L. Tate
Attorney, Agent, or Firm—Donald L. Johnson; John F. Sieberth; Lewis Hess

EXEMPLARY CLAIM

1. A process for the preparation of beryllium hydride which comprises pyrolyzing a dialkylberyllium compound, wherein each alkyl group contains up to about 12 carbon atoms in admixture with a catalytic quantity of product modifier selected from the group consisting of lithium hydride and an organic lithium compound capable of providing lithium hydride upon pyrolysis.

8 Claims, No Drawings

PROCESS FOR THE PRODUCTION OF BERYLLIUM HYDRIDE

This invention relates to and has as its principal object the provision of a novel and effective process for the production of high purity beryllium hydride.

In accordance with this invention, beryllium hydride is produced, often in purity in the range of 84-85 percent $BeH_2$, by employing certain lithium catalysts during the pyrolysis of a dialkylberyllium compound. It has been found, for example, that when the diethyl etherate of di-tert-butyl beryllium is subjected to pyrolysis temperatures (viz., 90°C. to 250°C.) the product so-formed contains 84–85 percent of $BeH_2$, provided that lithium hydride or a congener thereof is present in the reaction system. On the other hand, when the same pyrolysis reaction is conducted in the absence of the lithium hydride material, the product invariably contains, at most, about 80 percent $BeH_2$. Inasmuch as high purity beryllium hydride is a desideratum in the chemical and allied arts, the improvements afforded by the present catalytic process constitute a welcome addition to the art.

As noted above, the catalysts which are used in this process include lithium hydride and compounds which are capable of liberating or forming lithium hydride under the prevailing pyrolysis conditions. Thus, besides lithium hydride itself, recourse may be had to organolithium compounds, especially those in which the hydrocarbyl group contains up to about 12 carbon atoms. Exemplary of such organolithium compounds are ethyl lithium, n-propyl lithium, isopropyl lithium, the several butyl lithiums, the amyl lithiums, the octyl lithiums, the decyl lithiums, the dodecyl lithiums, cyclohexyl lithium, the methylcyclohexyl lithiums, beta-phenylethyl lithium, butenyllithium, the hexenyl lithiums, as well as mixtures of two or more of such compounds. From the standpoint of maximum cost-effectiveness and simplicity of operation the most preferred lithium catalysts for use in the practice of this invention are lithium hydride and tert-butyl lithium. Other suitable lithium catalysts will now be evident to and appreciated by those skilled in the art.

The lithium-containing catalyst adjuvants utilized pursuant to this invention are employed in relatively small catalytic quantity in order to achieve best results. Although the precise amount of this catalyst will vary to some extent depending upon the nature of the particular catalyst being utilized and upon the nature of the beryllium compound being subjected to pyrolysis, it is generally sufficient to employ from about 1 to about 10 mole percent of the lithium-containing catalyst, based upon the quantity (in moles) of the dialkylberyllium compound being subjected to pyrolysis. It will be understood and appreciated that departures from the foregoing range of concentrations may be made to suit the needs of the occasion.

To effect the pyrolysis of the present invention, the mixture of the dialkylberyllium compound and the lithium-containing catalyst is heated in a suitable reaction system to a temperature within the range of from about 90° to about 250°C. Here again, the precise temperature selected for optimum results will be dependent to some extent upon the identity of the beryllium reactant and of the lithium-containing catalyst as well as upon the proportions in which they are utilized. Generally speaking, temperatures in the range of about 180° to about 210°C. are most preferred when utilizing the preferred lithium-containing catalysts -- viz., lithium hydride and tert-butyl lithium.

The pyrolysis reaction is conducted for a period of time sufficient to result in the liberation of the organic material, generally corresponding to the alkyl group initially present on the dialkylberyllium reactant. With this procedure, the resultant product will contain an appreciable yield of high purity beryllium hydride product. Thus, in a batch process, the mixture of dialkylberyllium compound plus lithium-containing catalyst can be heated to the reaction temperature and the system maintained under such conditions for a period of time ranging from about 60 minutes up to about 72 hours. It is also entirely feasible to conduct the process of this invention on a continuous or semicontinuous basis. This is accomplished for example by introducing a suitable mixture of the beryllium reactant and lithium-containing catalyst by means of a screw conveyor or similar device into and through a hot tubular reactor in which the principal reaction occurs. The high purity beryllium hydride-containing product is thereupon readily discharged from the hot tube into a suitable product collection apparatus. If desired, the vent gases may be collected by means of suitable collection ports and used as a fuel for effecting heating of the tubular reactor. Other variations in reaction equipment and in reaction technique will now be readily apparent to those skilled in the art.

A wide variety of dialkylberyllium compounds may be used in the practice of this invention. Generally speaking, the alkyl groups of the dialkylberyllium will each contain up to about 12 carbon atoms. Such compounds may be used in their pure (i.e., uncomplexed) state or they may be used in the form of etherate complexes. Generally speaking, it is preferable to use dialkylberyllium etherates as these complexes are more readily prepared and are easier to handle than the uncomplexed beryllium compounds. Exemplary of suitable dialkylberyllium compounds for use in the present process are diethyl beryllium, dipropyl beryllium, diisopropyl beryllium, di-n-butyl beryllium, diisobutyl beryllium, di-sec-butyl beryllium, di-tert-butyl beryllium, the diamyl berylliums, the dihexyl berylliums, the diheptyl berylliums, the dioctyl berylliums, the dinonyl berylliums, the didecyl berylliums, the diundecyl berylliums, the didodecyl berylliums, as well as mixtures of two or more such materials. When the foregoing are utilized in the form of etherate complexes, the complexing ether may be a simple monoether such as diethyl ether, dipropyl ether, methylbutyl ether, diphenyl ether, and the like, or it may be a cyclic ether such as tetrahydrofuran, 1,3-dioxane, 1,4-dioxane, 1,3-dioxolane, and the like. Preferred beryllium reactants for use in this invention are the dialkylberyllium etherates, in which the alkyl groups of the dialkyl beryllium each contain up to about six carbon atoms, especially when such di-lower alkyl beryllium compounds are complexed with such ethers as diethyl ether, diisopropyl ether and similar dialkyl ethers whose alkyl groups likewise each contain up to about six carbon atoms.

The most particularly preferred beryllium reagents for use in this invention are di-tert-butyl beryllium and di-tert-butyl beryllium etherates, especially where the ether complexed with the di-tert-butyl beryllium is a dialkylether in which each alkyl group contains up to about six carbon atoms. Especially good results have been achieved when utilizing the diethyl etherate of di-tert-butyl beryllium.

In order to demonstrate the practices and advantages of this invention a series of comparative experiments was conducted. In each run the diethyl etherate of di-tert-butyl beryllium was used as the beryllium hydride precursor. In Runs 1 to 3, this beryllium compound was utilized in the absence of a lithium-containing catalyst and subjected to appropriate pyrolysis temperatures until the reaction had proceeded essentially to completion. Thereupon, the product of the reaction was subjected to chemical analysis to determine the weight percentage of beryllium hydride (as $BeH_2$) contained therein. Thereafter, the same general procedure was utilized with the exception that lithium-containing adjuvants of this invention were associated with the di-tert-butyl beryllium diethyl etherate and the resulting mixture subjected to the pyrolysis. The particular reaction conditions and results achieved are summarized and presented in the following table.

TABLE

Pyrolysis of Di-tert-butyl Beryllium Diethyl Etherate with and without Lithium-Containing Catalysts

| Run No. | Catalyst Employed | Mol % of Catalyst* | Pyrolysis Temp. °C | Time of Pyrolysis Min. | Product Analysis Wt. % $BeH_2$ |
|---|---|---|---|---|---|
| 1 | None | Nil | 200 | 135 | 78.9 |
| 2 | None | Nil | 200 | 90 | 79.0 |
| 3 | None | Nil | 200 | 90 | 72.5 |
| 4 | Lithium hydride | 5 | 205 | 120 | 84.4 |
| 5 | Tertiarybutyl lithium | 5 | 200 | 90 | 84.8 |

*Based on the quantity of di-tert-butyl beryllium diethyl etherate present.

It will be seen from the above data that in Runs 4 and 5, which are exemplary of the process of this invention, the purity of the product was substantially better than the purity of the product of Runs 1–3 in which no lithium-containing catalyst was employed.

The beryllium hydride obtained by the process of this invention is a useful intermediate in the preparation of beryllium alkyls by olefination. It can be used for the metal plating of suitable substrates by thermal decomposition under suitable conditions in contact with said substrates. It is useful as a source (by thermal decomposition) of pure metallic beryllium for use in alloys and as a chemical raw material.

What is claimed is:

1. A process for the preparation of beryllium hydride which comprises pyrolyzing a dialkylberyllium compound, wherein each alkyl group contains up to about 12 carbon atoms in admixture with a catalytic quantity of a product modifier selected from the group consisting of lithium hydride and an organic lithium compound capable of providing lithium hydride upon pyrolysis.

2. The process of claim 1 wherein said material is lithium hydride.

3. The process of claim 1 wherein said dialkylberyllium compound is a dialkylberyllium etherate in which said alkyl groups each contain up to about six carbon atoms.

4. The process of claim 1 wherein said dialkylberyllium compound is a dialkylberyllium etherate in which said alkyl groups each contain up to about six carbon atoms and wherein said material is lithium hydride.

5. The process of claim 1 wherein said dialkylberyllium compound is a dialkylberyllium etherate in which said alkyl groups each contain up to about six carbon atoms and wherein said material is tert-butyl lithium.

6. A process for the preparation of beryllium hydride which comprises pyrolyzing a di-tert-butyl beryllium etherate in admixture with a catalytic quantity of a product modifier selected from the group consisting of lithium hydride and an organic lithium compound capable of providing lithium hydride upon pyrolysis.

7. The process of claim 6 wherein said material is lithium hydride.

8. The process of claim 6 wherein said material is a butyl lithium.

* * * * *